UNITED STATES PATENT OFFICE 2,053,819

PROCESS OF DYEING CELLULOSE ESTERS

Friedrich Felix and Wilhelm Huber, Basel, Switzerland, assignors to the firm Society of Chemical Industry in Basle, Basel, Switzerland No Drawing. Application April 2, 1936, Serial No. 72,414. In Switzerland April 5, 1935

6 Claims. (Cl. 8—5)

It has been found that the sulfo-acetonitrile dyestuffs of the general formula

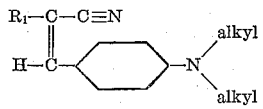

wherein $R_1$ represents the radical of an organic sulfone, which sulfo-acetonitrile dyestuffs do not form salts stable in water with alkalies, dye ethers and esters of cellulose yellow to orange tints. The products have therefore the following general formula

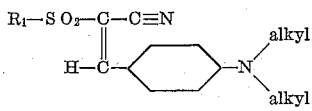

wherein $R_1$ represents alkyl, aralkyl, cycloalkyl or aryl.

Such products are obtainable by condensing alkyl-, aralkyl-, or aryl-sulfo-acetonitrile with a dialkylaminobenzaldehyde, for example, by condensing methylsulfo-acetonitrile, ethylsulfoacetonitrile, propylsulfo-acetonitrile, butylsulfoacetonitrile, allylsulfo-acetonitrile, cyclohexylsulfoacetonitrile, thiophenesulfo-acetonitrile or the like with a dialkylaminobenzaldehyde. Instead of the aliphatic sulfo-acetonitrile there may be used an araliphatic sulfo-acetonitrile, for instance benzylsulfo-acetonitrile which may contain substituents in the benzyl residue. There are also obtained condensation products which are dyestuffs by condensing aromatic sulfo-acetonitriles, for instance benzenesulfo-acetonitrile, toluenesulfo-acetonitrile, with a dialkylamino-benzaldehyde. As aldehydes there may be mentioned:—dimethylamino - benzaldehyde, di - ethylamino - benzaldehyde, ethylmethylamino - benzaldehyde, dipropylamino-benzaldehyde or dibutylamino-benzaldehyde. These condensation products may contain in one or both aromatic residues substituents such as OH groups, alkyloxy-groups, halogen, nitro or amino groups.

Such condensation products which are yellow powders dissolve in various organic solvents to yellow or greenish-yellow solutions and may be used for dyeing lacquers which are made from a basis of nitro cellulose, acetyl cellulose or natural or artificial resins. They may also be used for dyeing artificial materials such as the condensation products from phenols or urea and formaldehyde. Finally they have in many cases affinity for acetate artificial silk and produce upon this material dyeings which are characterized by clarity, purity of tint and good properties of fastness. The products have the special advantage that many of them yield dyeings which are fast to sublimation, which is of great importance in many cases. For dyeing acetate silk the products are brought into a state of fine suspension by treating them with the usual auxiliaries, for instance sulfite cellulose liquor, sulfonated resinous products, tanning materials, soaps and substitutes for soap. If the condensation products contain free amino groups, the dyeings produced may be further transformed on the fibre, for example, by diazotizing and treatment with a coupling component; both the tint and degree of fastness of the dyeing may be profoundly altered. When salt-forming groups such as hydroxy-groups or carboxyl groups are present, the dyeings may be treated, if desired, with agents yielding metal.

The following examples illustrate the invention, the parts being by weight:—

Example 1

5 parts of the condensation product from para-toluenesulfo-acetonitrile and para-diethylamino-benzaldehyde are made into a paste with 25 parts of methylglycol and this paste is mixed with 1000 parts of commercial nitro cellulose lacquer whereupon the dyestuff dissolves to a clear solution. Preferably the dissolution is accelerated by heating in a reflux apparatus. For dyeing metal sheets, wood, glass, leather, paper or the like, the greenish-yellow lacquer is applied to the material by immersion, spraying, brushing or the like and the dyed material is dried in the usual manner, whereby bright green-yellow colorings are obtained.

If instead of para-toluenesulfo-acetonitrile benzosulfo-acetonitrile is used in the condensation, the product obtained will have properties of dyeing similar to those described above. Instead of para-diethylaminobenzaldehyde, para-dimethylamino-benzaldehyde may be used. All these products dye acetate silk similar tints.

Example 2

10 parts of dyestuff obtained by condensing para-diethylaminobenzaldehyde with methylsulfo-acetonitrile in an alcoholic solution in presence of some piperidine, sodiumethylate or caustic soda are ground to form a uniform paste containing 20 per cent of dyestuff with an addition of a suitable dispersing agent, for instance Turkey red oil, sulfitecellulose liquor or sulfonation products of the residue of the benzaldehyde manufacture. One part of this paste is intimately mixed with 10 parts of water at 50° C. and so much of a concentrated soap solution that the dye bath to be produced will have a content of 2 per cent of soap solution. The whole is now diluted with cold water to about 300 parts. Into the emulsion thus prepared there are entered 10 parts of acetate artificial silk yarn and the latter is handled while the temperature of the dye bath is raised within ¾ hour to 75° C.; dyeing is continued at this temperature for about ¼ hour whereupon the yarn is rinsed and brightened as usual. The dyeing is a vivid green-yellow.

If the condensation product from ethylsulfo-acetonitrile or allylsulfo-acetonitrile and a dialkylaminobenzaldehyde is used, a product having similar dyeing properties is obtained.

What we claim is:—

1. Process of dyeing the esters of cellulose, comprising treating the material with sulfo-acetonitrile dyestuffs of the general formula

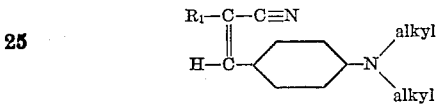

wherein $R_1$ represents the radical of an organic sulfone, which sulfo-acetonitrile dyestuffs do not form salts stable in water with alkalies.

2. Process of dyeing the esters of cellulose, comprising treating the material with sulfo-acetonitrile dyestuffs of the general formula

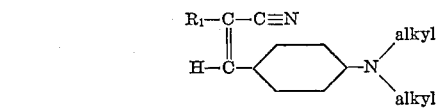

wherein $R_1$ represents the radical of an organic sulfone and wherein the alkyl radicals consist of not more than 2 carbon atoms, which sulfo-acetonitrile dyestuffs do not form salts stable in water with alkalies.

3. Process of dyeing the esters of cellulose, comprising treating the material with sulfo-acetonitrile dyestuffs of the general formula

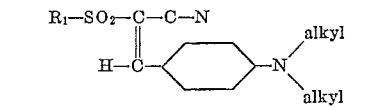

wherein $R_1$ represents the radical of an aryl nucleus of the benzene series and wherein the alkyl radicals consist of not more than 2 carbon atoms, which sulfo-acetonitrile dyestuffs do not form salts stable in water with alkalies.

4. Process of dyeing the esters of cellulose, characterized by using the sulfo-acetonitrile dyestuff of the formula

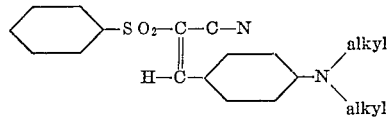

which dyestuff does not form salts stable in water with alkalies.

5. Process of dyeing the esters of cellulose, comprising treating the material with sulfo-acetonitrile dyestuffs of the general formula

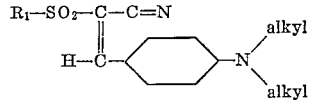

wherein $R_1$ represents an aliphatic radical containing at least 2 carbon atoms, which sulfo-acetonitrile dyestuffs do not form salts stable in water with alkalies.

6. Process of dyeing the esters of cellulose, comprising treating the material with the sulfo-acetonitrile dyestuff of the formula

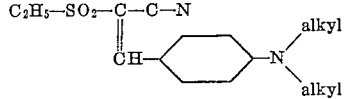

which dyestuff does not form salts stable in water with alkalies.

FRIEDRICH FELIX.
WILHELM HUBER.